(12) United States Patent
Saitou et al.

(10) Patent No.: US 9,045,620 B2
(45) Date of Patent: Jun. 2, 2015

(54) RUBBER COMPOSITION, CROSS-LINKED RUBBER COMPOSITION, AND TIRE

(75) Inventors: Kouichi Saitou, Kodaira (JP); Keiichi Aomatsu, Kodaira (JP); Masaki Yanagioka, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 14/238,899

(22) PCT Filed: Aug. 31, 2012

(86) PCT No.: PCT/JP2012/005547
§ 371 (c)(1),
(2), (4) Date: Feb. 14, 2014

(87) PCT Pub. No.: WO2013/031242
PCT Pub. Date: Mar. 7, 2013

(65) Prior Publication Data
US 2014/0213695 A1   Jul. 31, 2014

(30) Foreign Application Priority Data
Aug. 31, 2011   (JP) .................................. 2011-190057

(51) Int. Cl.
*C08K 3/34* (2006.01)
*C08J 9/32* (2006.01)
*C08K 7/26* (2006.01)
*C08K 3/36* (2006.01)
*B60C 1/00* (2006.01)

(52) U.S. Cl.
CPC ... *C08K 7/26* (2013.01); *C08K 3/36* (2013.01); *B60C 1/0016* (2013.04); *C08K 2201/002* (2013.01); *C08K 2201/003* (2013.01)

(58) Field of Classification Search
USPC ....................................................... 524/493
See application file for complete search history.

(56) References Cited

U.S. PATENT DOCUMENTS

| | | | | |
|---|---|---|---|---|
| 8,293,833 | B2 * | 10/2012 | Hochi et al. ................. | 524/493 |
| 2003/0200900 | A1 | 10/2003 | Korth et al. | |
| 2007/0059232 | A1 | 3/2007 | Stenzel et al. | |
| 2007/0125269 | A1 | 6/2007 | Nishi | |
| 2008/0027166 | A1 | 1/2008 | Hochi et al. | |
| 2010/0144954 | A1 * | 6/2010 | Kikuchi et al. ............... | 524/506 |

FOREIGN PATENT DOCUMENTS

| | | |
|---|---|---|
| CN | 1453312 A | 11/2003 |
| CN | 1863734 A | 11/2006 |
| CN | 1927712 A | 3/2007 |
| CN | 101139096 A | 3/2008 |
| EP | 2 196 324 A1 | 6/2010 |
| EP | 1 295 850 A1 | 3/2015 |
| EP | 1 762 544 A1 | 3/2015 |
| JP | 8-259220 A | 10/1996 |
| JP | 2004-2843 A | 1/2004 |
| JP | 2005-53744 A | 3/2005 |
| JP | 2005-179514 A | 7/2005 |
| JP | 2007-77012 A | 3/2007 |
| JP | 2007-138069 A | 6/2007 |
| JP | 2010-138249 A | 6/2010 |

OTHER PUBLICATIONS

Communication dated Dec. 29, 2014, issued by the State Intellectual Property Office of P.R. China in corresponding Chinese Application No. 201280042630.4.

Extended European Search Report dated Mar. 2, 2015, issued by the European Patent Office in corresponding European Application No. 12827029.5.

* cited by examiner

*Primary Examiner* — Hui Chin
(74) *Attorney, Agent, or Firm* — Sughrue Mion, PLLC

(57) ABSTRACT

An object of the present invention is to provide: a rubber composition which, when it is applied to a component member (such as a tread) of a tire, exhibits good wear resistance without deteriorating rolling resistance of the tire; a cross-linked rubber composition obtained by cross-linking the rubber composition; and a tire using the rubber composition or the cross-linked rubber composition as a material thereof. Specifically, the present invention provides a rubber composition obtained by blending and kneading a rubber component and hydrated silica together, characterized in that: provided that D represents the average primary particle diameter and LP represents the log differential pore volume at a pore diameter of 30 nm, of the hydrated silica in the rubber composition, D and LP satisfy relationships represented by following formula (1) and (2).

$$LP > -0.045 \times D + 1.45 \quad (1)$$

$$D < 30 \text{ nm} \quad (2).$$

6 Claims, 3 Drawing Sheets

RUBBER COMPOSITION, CROSS-LINKED RUBBER COMPOSITION, AND TIRE

CROSS REFERENCE TO RELATED APPLICATIONS

This application is a National Stage of International Application No. PCT/JP2012/005547 filed Aug. 31, 2012, claiming priority based on Japanese Patent Application No. 2011-190057 filed Aug. 31, 2011, the contents of all of which are incorporated herein by reference in their entirety.

TECHNICAL FIELD

The present invention relates to a rubber composition which, when it is applied to a component member of a tire, exhibits good wear resistance without deteriorating rolling resistance of the tire. The present invention also relates to a tire using the rubber composition.

BACKGROUND ART

A pneumatic tire is generally required to exhibit good performances in different physical properties simultaneously. Some component members of a tire such as a tread in particular are strongly requested to realize good rolling resistance properties and good wear resistance in a compatible manner in a resulting tire. However, good rolling resistance properties and good wear resistance are basically incompatible with each other. A number of trial-and-error attempts have therefore been made to make good rolling resistance properties and good wear resistance compatible.

Hydrated silica is used as a reinforcing filler in a rubber composition for a tire tread. In general, an increase in content of hydrated silica blended in a rubber composition for a tread of a tire improves wear resistance to some extent but possibly deteriorates rolling resistance properties of the tire. Further, an increase in content of hydrated silica in such a rubber composition as described above may unnecessarily enhance viscosity of unvulcanized rubber, depending on applications, thereby deteriorating workability of the rubber composition.

In view of the situation described above, there has been developed a technique of improving rolling resistance properties of a tire by using hydrated silica having large-sized primary particles in the tire to improve dispersibility of hydrated silica particles into a rubber component.

However, storage modulus and possibly wear resistance of a tire may deteriorate, although rolling resistance properties of the tire improve to some extent, in a case where hydrated silica having large-sized primary particles is used. Further, use of such hydrated silica having cohesive force thereof adjusted as described above in place of the conventional hydrated silica still has room for improvement in terms of well achieving good rolling resistance properties and good wear resistance in a satisfactorily compatible manner.

Therefore, considering that use of hydrated silica having large-sized primary particles possibly deteriorates storage modulus of the tire, a technique of using hydrated silica having a cohesive force factor and cetyltrimethylammonium bromide (CTAB) adsorption specific surface area each adequately adjusted in a rubber composition of a tire has been disclosed in order to improve storage modulus and low heat-generation property of the tire, while maintaining good dispersibility of the rubber composition (PTL 1).

Hydrated silica particles in a coagulated state of PTL 1 generally have a number of pores on the collective outer surface thereof and each pore opens at an opening portion thereof in the outer surface. These pores are involved with adsorption of rubber molecular chains. In this connection, there is a demand for optimizing a rubber-capturing volume, which closely relates to wear resistance performance, of silisic acid hydrate of PTL 1, in order to further enhance wear resistance of a tire.

CITATION LIST

Patent Literature

PTL 1: JP 2007-138069 (Laid-Open)

SUMMARY OF THE INVENTION

Technical Problems

An object of the present invention is to provide: a rubber composition which, when it is applied to a component member (such as a tread) of a tire, exhibits good wear resistance without deteriorating rolling resistance of the tire; a cross-linked rubber composition obtained by cross-linking the rubber composition; and a tire using the rubber composition or the cross-linked rubber composition as a material thereof.

Solution to the Problems

The inventors of the present invention, as a result of a keen study to solve the aforementioned problems, discovered that it is possible to more accurately determine a void volume involved with capture of a rubber component (a rubber-capturing volume) of hydrated silica in a rubber composition obtained by blending and kneading the rubber component and the silicic hydrate together, than the prior art, by specifically measuring a void volume "primarily" involved with capture of the rubber component.

The inventors of the present invention then as a result of a further study paid their attention to a relationship between the (average) primary particle diameter (D) and the log differential pore volume (LP) of hydrated silica and discovered that a rubber-capturing volume of the hydrated silica is optimized so that desired wear resistance of a tire can be obtained without deteriorating rolling resistance thereof when D and LP satisfy relationships represented by following formulae (1) and (2), thereby completing the present invention.

$$LP > -0.045 \times D + 1.45 \qquad (1)$$

$$D < 30 \text{ nm} \qquad (2)$$

The primary features of the present invention, contrived based on the discoveries described above, are as follows.

1. A rubber composition obtained by blending and kneading a rubber component and hydrated silica together, characterized in that:

provided that D represents the average primary particle diameter and LP represents the log differential pore volume at a pore diameter of 30 nm, of the hydrated silica in the rubber composition, D and LP satisfy relationships represented by following formulae (1) and (2).

$$LP > -0.045 \times D + 1.45 \qquad (1)$$

$$D < 30 \text{ nm} \qquad (2)$$

2. The rubber composition of (1) above, wherein the hydrated silica is blended at a content of 10 to 150 parts by mass with respect to 100 parts by mass of the rubber component.

3. The rubber composition of (1) above, wherein the rubber component is at least one type of rubber selected from natural rubber and diene-based synthetic rubber.

4. A cross-linked rubber composition, as a cross-linked rubber product obtained by cross-linking the rubber composition of (1) above.

5. A tire, including the rubber composition of (1) above or the cross-linked rubber composition of (4) above as a material thereof.

Advantageous Effect of the Invention

According to the rubber composition of the present invention, it is possible to provide: a rubber composition capable of achieving good wear resistance without causing deterioration of rolling resistance of a tire; and a cross-linked rubber composition obtained by cross-linking the rubber composition. It is therefore possible to realize a high-performance pneumatic tire exhibiting good rolling resistance properties and good wear resistance in a compatible manner by using the rubber composition or the cross-linked rubber composition as a tire material.

DESCRIPTION OF THE EMBODIMENTS

Figure 1:
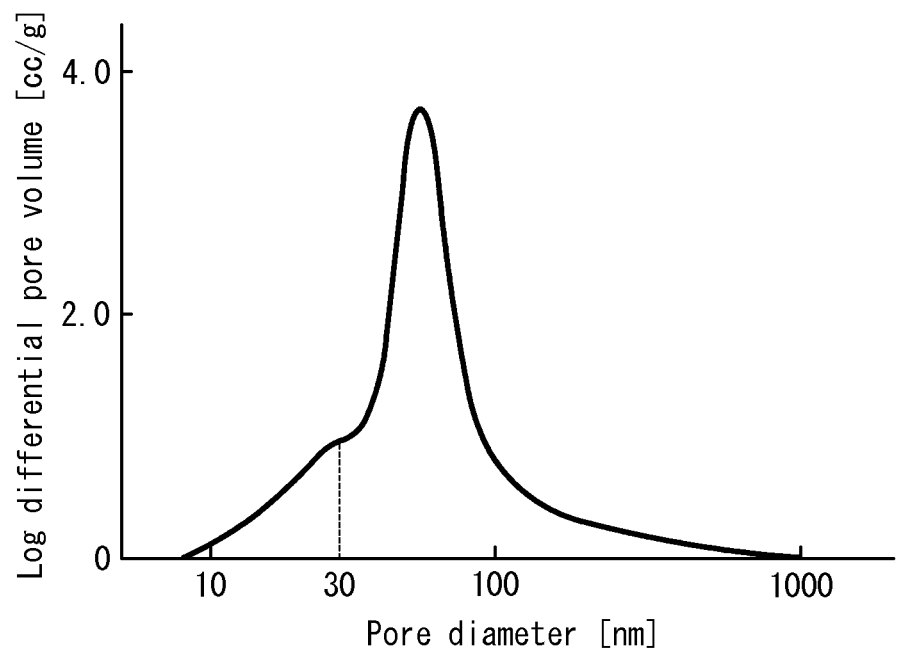
FIG. 1 is a graph showing a relationship between the pore diameter (nm) of hydrated silica and the log differential pore volume (cc/g).

The present invention will be described in detail hereinafter.
(Rubber Composition)
The rubber composition of the present invention is a rubber composition obtained by blending and kneading a rubber component and hydrated silica together.

Types of the rubber component to be blended and kneaded in the rubber composition are not particularly limited but it is preferable to use either natural rubber or diene-based synthetic rubber solely, or both natural rubber and diene-based synthetic rubber in combination, in terms of attaining high wear resistance. Examples of the diene-based synthetic rubber include polyisoprene rubber (IR), styrene/butadiene copolymer rubber (SBR), polybutadiene rubber (BR), and the like. Styrene/butadiene copolymer rubber (SBR) is preferable among these examples. The aforementioned examples of the diene-based synthetic rubber may be used either solely or as a blend of two or more types.

Types of a method for kneading the rubber component and the hydrated silica are not particularly limited. For example, the rubber component and the hydrated silica can be kneaded by using an open type kneader like a roll, or a sealed type kneader like a banbury mixer. It is acceptable to knead raw materials including hydrated silica and a rubber latex solution as a rubber component in a wet masterbatch.

The present invention is characterized in that, provided that D represents the average primary particle diameter and LP represents the log differential pore volume at a pore diameter of 30 nm, of the hydrated silica in the rubber composition, D and LP satisfy relationships represented by following formulae (1) and (2).

$$LP > -0.045 \times D + 1.45 \quad (1)$$

$$D < 30 \text{ nm} \quad (2)$$

A void volume not contributing to capture of the rubber component, e.g. a void volume between secondary particles, can be excluded in consideration from the void volume of the hydrated silica contained in a rubber composition obtained by kneading the hydrated silica and the rubber component, by studying the aforementioned formulae (1) and (2), so that a rubber-capturing volume of the hydrated silica can be grasped more accurately. The conventional technique of measuring a void volume and a surface area of hydrated silica before kneading cannot accurately grasp a rubber-capturing volume of the hydrated silica.

Further, the particle diameter and the pore volume of the hydrated silica are optimized so that the hydrated silica can capture the rubber component as much as possible when the primary particle diameter (D) and the log differential pore volume (LP) at a pore diameter of 30 nm, of the hydrated silica, satisfy the aforementioned formulae (1) and (2), thereby successfully realizing high wear resistance without deteriorating rolling resistance of a tire. The larger pore volume at a pore diameter of 30 nm, of hydrated silica, realizes the better reinforcing properties of the rubber composition and thus the higher wear resistance of the tire.

The log differential pore volume (LP) described above is obtained by: calculating the value (dV/d(log D)) by dividing a differential pore volume dV by a differential value of the logarithmic value of a pore diameter, i.e. d(log D); and plotting the value (dV/d(log D)) versus the pore diameter. In this connection, FIG. 1 represents a graph showing a relationship between the pore diameter (nm) of hydrated silica and the log differential pore volume (cc/g) associated therewith.

The log differential pore volume (LP) at a pore diameter of 30 nm, of hydrated silica, is used as a criterion for judging whether good wear resistance can be obtained or not in the formula (1) because an irrelevant interparticle void volume not contributing capture of the rubber component is excluded from the void volume formed in the hydrated silica, so that a rubber-capturing volume can be grasped accurately, when the formula (1) is satisfied. The formula (2) specifies a diameter range of primary particles, effective in terms of reinforcing the rubber composition.

A "rubber-capturing volume" represents a volume of pores involved with capture of a rubber component, of the total void volume possessed by the hydrated silica. The "irrelevant interparticle void volume" represents a volume of voids formed between respective secondary (coagulated) particles of hydrated silica when plural secondary particles of the hydrated silica exist close to each other. The pore diameter range of the irrelevant interparticle void volume is significantly different from the pore diameter range of the rubber-capturing volume and therefore measuring the log differential pore volume at a pore diameter of 30 nm, of the hydrated silica, safely represents measuring the rubber-capturing volume.

In the graph showing a relationship between the pore diameter and the log differential pore volume of hydrated silica of FIG. 1, the log differential pore volumes (LP) at pore diameters of 30 nm and the vicinities thereof collectively represent the rubber-capturing volume and the pore volumes at pore diameters ≥50 nm collectively represent an irrelevant interparticle volume.

A "primary particle" of hydrated silica represents a particle as the minimum unit constituting the hydrated silica and the particle diameter thereof is approximately 10 to 30 nm. It is assumed that each secondary particle of the hydrated silica is formed by a plurality (e.g. 2 to 100) of coagulated hydrated silica primary particles. It should be noted that "pores" of the hydrated silica represent voids formed between the respective primary particles of the hydrated silica in the present invention.

Types of a method for measuring the primary particle diameter and the pore diameter of the hydrated silica are not particularly limited, as long as the method can measure these diameters accurately, in the present invention.

For example, the primary particle diameter and the pore diameter can be measured by: subjecting the rubber composition to heating treatment and then acid treatment using acid such as hydrochloric acid, to remove the rubber component therefrom and collect the remaining hydrated silica; and measuring the primary particle diameter and the pore diameter of the hydrated silica thus collected, by using an analyzer such as a mercury porosimeter, an electron microscope and the like.

In the present invention, the average primary particle diameter (D) and the log differential pore volume (LP) at a pore diameter of 30 nm, of the hydrated silica, preferably satisfy following formula (3) and more preferably satisfy following formula (4) in addition to formulae (1) and (2) because the rubber-capturing volume of the hydrated silica is then further optimized and thus further higher wear resistance of a tire can be obtained.

$$LP > -0.048 \times D + 1.75 \quad (3)$$

$$LP > -0.050 \times D + 2.00 \quad (4)$$

Content of the hydrated silica is preferably in the range of 10 to 150 parts by mass and more preferably in the range of 30 to 100 parts by mass with respect to 100 parts by mass of the rubber component. The hydrated silica may not satisfy the requirements of the formula (1) when content thereof is less than 10 parts by mass with respect to 100 parts by mass of the rubber component, which may deteriorate low-heat generation property of the rubber composition, as well as rolling resistance of a resulting tire. The content of the hydrated silica exceeding 150 parts by mass with respect to 100 parts by mass of the rubber component may deteriorate workability of the rubber composition and decrease wear resistance of a resulting tire.

A silane coupling agent is blended by a content of 1 to 20 parts by mass, preferably 3 to 16 parts by mass, and more preferably 5 to 12 parts by mass, with 100 parts by mass of the hydrated silica in the rubber composition of the present invention. A good effect caused by inclusion of the hydrated silica is further improved so that the physical properties such as low-heat generation property and storage modulus of the rubber composition can further improve, by blending at least 1 part by mass of the silane coupling agent with 100 parts by mass of the hydrated silica. On the other hand, content of the silane coupling agent thus blended, exceeding 20 parts by mass with respect to 100 parts by mass of the hydrated silica, may fail to further improve low-heat generation property, storage modulus and the like of the rubber composition to meaninglessly increase the production cost.

Preferable examples of the silane coupling agent include compounds represented by following formula (IV), formula (V), formula (VI) and formula (VII), respectively.

$$A_mB_{3-m}Si—(CH_2)_a—S_b—(CH_2)_a—SiA_mB_3, \quad (IV)$$

In formula (IV), A, B, m, a, and b are defined as in formula (IV) of PTL 1, i.e. A represents $C_nH_{2n+1}O$ (n is an integer in the range of 1 to 3) or a chlorine atom, B represents a $C_{1-3}$ alkyl group, m is an integer in the range of 1 to 3, a is an integer in the range of 1 to 9, b is an integer≥1 which may allow nonstoichiometric distribution of sulfur atoms, two "B"s may be the same or different from each other when m=1, and two or three "A"s may be the same or different from each other when m=2 or 3.

$$A_mB_{3-m}Si—(CH_2)_c—Y \quad (V)$$

In formula (V), A, B, Y, m, and c are defined as in formula (V) of PTL 1, i.e. A represents $C_nH_{2n+1}O$ (n is an integer in the range of 1 to 3) or a chlorine atom, B represents a $C_{1-3}$ alkyl group, Y represents one of mercapto, vinyl, amino, glycidoxy and epoxy groups, m is an integer in the range of 1 to 3, c is an integer in the range of 0 to 9, two "B"s may be the same or different from each other when m=1, and two or three "A"s may be the same or different from each other when m=2 or 3.

$$A_mB_{3-m}Si—(CH_2)_a—S_b—Z \quad (VI)$$

In formula (VI), A, B, Z, m, a, and b are defined as in formula (VI) of PTL 1, i.e. A represents $C_nH_{2n+1}O$ (n is an integer in the range of 1 to 3) or a chlorine atom, B represents a $C_{1-3}$ alkyl group, Z represents one of benzothiazolyl, N—N-dimethylthiocarbamoyl and methacryloyl groups, m is an integer in the range of 1 to 3, a is an integer in the range of 1 to 9, b is an integer≥1 which may allow nonstoichiometric distribution of sulfur atoms, two "B"s may be the same or different from each other when m=1, and two or three "A"s may be the same or different from each other when m=2 or 3.

$$R^1_xR^2_yR^3_zSi—R^4—S—CO—R^5 \quad (VII)$$

In formula (VII), $R^1$, $R^2$, $R^3$, $R^4$, $R^5$, x, y and z are defined as in JP 2012-017440, i.e. $R^1$, having 1 to 18 carbon atoms, is selected from $R^6O—$, $R^6C(=O)O—$, $R^6R^7C=NO—$, $R^6R^7NO—$, $R^6R^7N—$, and $—(OSiR^6R^7)_n(OSiR^5R^6R^7)$, wherein $R^6$ and $R^7$ each independently represent one of $C_{1-18}$ alkyl, $C_{1-18}$ cycloalkyl, $C_{1-18}$ alkenyl, $C_{1-18}$ cycloalkenyl and $C_{1-18}$ aryl groups, and n is in the range of 0 to 10); $R^2$ represents hydrogen or a group selected from $C_{1-18}$ alkyl, $C_{1-18}$ cycloalkyl, $C_{1-18}$ alkenyl, $C_{1-18}$ cycloalkenyl and $C_{1-18}$ aryl groups; $R^3$ represents $—O(R^8O)_m]_{0.5}—$, wherein $R^8$ is a group selected from $C_{1-18}$ alkylene and $C_{1-18}$ cycloalkylene groups and m is in the range in the range of 1 to 4; x, y and z satisfy relationships x+y+2z=3 and 0≤x≤3 and 0≤y≤2 and 0≤z≤1; $R^4$ represents a group selected from $C_{1-18}$ alkylene, $C_{1-18}$ cycloalkylene, $C_{1-18}$ cycloalkylalkylene, $C_{1-18}$ alkenylene, $C_{1-18}$ arylene, and $C_{1-18}$ aralkylene groups; and $R^5$ represents a group selected from $C_{1-18}$ alkyl, $C_{1-18}$ cycloalkyl, $C_{1-18}$ alkenyl, $C_{1-18}$ cycloalkenyl. $C_{1-18}$ aryl group, and $C_{1-18}$ aralkyl group.

These examples of the silane coupling agents may be used either solely or as a blend of two or more types.

Specific examples of the compound represented by the formula (IV) include Bis(3-triethoxysilylpropyl)tetrasulfide, Bis(3-trimethoxysilylpropyl)tetrasulfide, Bis(3-methyldimethoxysilylpropyl)tetrasulfide, Bis(3-triethoxysilylethyl)tetrasulfide, Bis(3-triethoxysilylpropyl)disulfide, Bis(3-trimethoxysilylpropyl)disulfide, Bis(3-triethoxysilylpropyl)trisulfide, and the like.

Specific examples of the compound represented by the formula (V) include 3-mercaptopropyl trimethoxysilane, 3-mercaptopropyl triethoxysilane, vinyltriethoxysilane, vinyltrimethoxysilane, 3-aminopropytriethoxysilane, 3-aminopropytrimethoxysilane, 3-mercaptopropylmethyl dimethoxysilane, γ-glycidoxypropyl trimethoxysilane, γ-glycidoxypropylmethyl diethoxysilane, and the like. Examples of the commercially available products of the compound include the product name "VPSi363" manufactured by Evonik Degussa GmbH.

Specific examples of the compound represented by the formula (VI) include 3-trimethoxysilylpropyl-N,N-dimethylcarbamoyl tetrasulfide, 3-trimethoxysilylpropyl benzothiazolyl tetrasulfide, 3-trimethoxysilylpropyl methacryloyl monosulfide, and the like.

In $R^2$, $R^5$, $R^6$ and $R^7$ of the compound represented by the formula (VII), alkyl group thereof may be either normal or branched and examples of the alkyl group include methyl, ethyl, propyl, isopropyl, and the like; alkenyl group thereof may be either normal or branched and examples of the alkenyl group include vinyl, allyl, methanyl, and the like; examples of cycloalkyl group thereof include cyclohexyl, ethylcyclohexyl, and the like; examples of cycloalkenyl group thereof include cyclohexenyl, ethylcyclohexenyl, and the like; examples of aryl group thereof include phenyl, tolyl, and the like; and examples of aralkyl group in $R^5$ include phenethyl and the like.

In $R^4$ and $R^8$ of the formula (VII), alkylene group thereof may be either normal or branched and examples of the alkylene group include methylene, ethylene, trimethylene, propylene, and the like; and examples of cycloalkylene group thereof include cyclohexylene, and the like. In $R^4$ of the formula (VII), alkenylene group thereof may be either normal or branched and examples of the alkenylene group include vinylene, propenylene, and the like; examples of cycloalkylalkylene group thereof include cyclohexylmethylene and the like; examples of arylene group thereof include phenylene and the like; and examples of aralkylene group thereof include xylylene and the like.

In $R^3$ of the formula (VII), examples of $-[O(R^8O)_m]_{0.5}-$ group include 1,2-ethane dioxy, 1,3-propane dioxy, 1,4-butane dioxy, 1,5-pentane dioxy, 1,6-hexane dioxy, and the like. The compound represented by the formula (VII) can be synthesized by a method similar to the method described in JP 2001-505225. Alternatively, a commercially available product such as "NXT" (represented by the formula (VII) wherein $R^1=C_2H_5O$, $R^4=C_3H_6$, $R^5=C_7H_{15}$, x=3, y=0, z=0, i.e. 3-octanoyl thiopropyl triethoxysilane) manufactured by Momentive Performance Materials Inc. may be used as the compound. The compound represented by the formula (V) or the compound represented by the formula (VII) are preferable among the compounds represented by the formulae (IV), (V), (VI) and (VII), respectively.

It is acceptable to use as the silane coupling agent an organic silicon compound having in a molecule thereof: a ring-shaped structure including nitrogen atom (N) and silicon atom (Si); at least one sulfur atom (S); and a site where at least one group each causing relatively small steric hindrance is bonded to the silicon atom (Si). This organic silicon compound, having a ring-shaped structure including nitrogen atom (N) and silicon atom (Si), is stable because the ring-shaped structure exhibits good stability in spite of presence of silicon-oxygen bond (Si—O). Accordingly, generation of an alcohol component due to hydrolysis of silicon-oxygen bond (Si—O) is prevented, i.e. generation of volatile organic compound (VOC) gas can be reduced, when the aforementioned organic silicon compound is used as the silane coupling agent. Specific examples of the organic silicon compound include those described in JP 2010-270044.

Carbon black as a reinforcing agent is preferably further blended with the rubber composition of the present invention. Content of the carbon black is preferably 80 parts by mass or less and more preferably 60 parts by mass or less with respect to 100 parts by mass of the rubber component. Carbon black content exceeding 80 parts by mass with respect to 100 parts by mass of the rubber component may deteriorate low-heat generation property of the rubber composition.

The total content of the carbon black and the hydrated silica is preferably 150 parts by mass or less and more preferably 100 parts by mass or less with respect to 100 parts by mass of the rubber component when the carbon black is blended with the rubber composition. It is possible to realize satisfactory low-heat generation property of the rubber composition and improve rolling resistance properties of a resulting tire by setting the total content of the carbon black and the hydrated silica to be 150 parts by mass or less with respect to 100 parts by mass of the rubber component.

Additives conventionally blended with a rubber composition may be blended with the rubber composition of the present invention unless inclusion of these additives adversely affects the effect of the present invention. Examples of the additives which may be blended in an appropriate manner with the rubber composition of the present invention include anti-oxidant, vulcanization accelerator, sulfur, zinc oxide, stearic acid, antiozonant, and the like, which are generally used in the rubber industry.

(Cross-linked Rubber Composition)

The cross-linked rubber composition of the present invention is characteristically obtained by cross-linking the rubber composition of the present invention. Conditions of cross-linking are not particularly restricted and a vulcanization process may be carried out under the known vulcanization conditions. Specifically, a vulcanization process may be carried out, e.g. at temperature of 100° C. or higher, preferably in the range of 125° C. to 200° C., and more preferably in the range of 130° C. to 180° C.

(Tire)

The tire of the present invention is characteristically obtained by applying the rubber composition or the cross-linked rubber composition described above as a tire material to any of component members of a tire. It is especially preferable to apply the rubber composition or the cross-linked rubber composition of the present invention to a tread among the component members of a tire because a tire using the rubber composition or the cross-linked rubber composition in a tread thereof exhibits good wear resistance without experiencing deterioration of rolling resistance. Examples of gas with which the tire of the present invention is to be inflated include ambient air, air having adjusted oxygen partial pressure, and inert gas such as nitrogen gas.

EXAMPLES

The present invention will be described in detail hereinafter by Examples, which, however, do not restrict the scope of the present invention.

Production Example 1

Production of Hydrated Silica A

97 L of water and 1.8 L of an aqueous solution of sodium silicate ($SiO_2$: 160 g/L, the mol ratio $SiO_2/Na_2O$=3.3) were charged into a jacketed stainless reaction vessel (180 L)

equipped with a stirrer and then heated to 70° C. Na$_2$O concentration in a resulting reaction solution was 0.015 mol/L. The same aqueous solution of sodium silicate as described above and sulfuric acid (18 mol/L) were simultaneously added dropwise to the reaction solution at flow rates of 370 mL/minute (the sodium silicate solution) and 16 mL/minute (sulfuric acid), respectively, with keeping the temperature of the reaction solution at 70° C. The neutralization reaction was carried out, while maintaining the Na$_2$O concentration in the reaction solution within the range of 0.005 mol/L to 0.035 mol/L by adjusting the flow rates of the sodium silicate solution and sulfuric acid. The reaction solution changed its color to opaque white in the midst of the neutralization reaction and then became a gel-like solution due to an increase in viscosity thereof 68 minutes after the start of the neutralization reaction. Addition of the sodium silicate solution and sulfuric acid to the reaction solution was continued and the reaction was stopped 120 minutes after the start of the neutralization reaction. Silica concentration in a resulting solution was 51 g/L. Then, the same sulfuric acid as described above was added to the resulting solution until pH of the solution dropped to 3, whereby a silicic acid slurry was obtained. The silicic acid slurry thus obtained was filtered by a filter press and then washed with water, whereby a wet cake was obtained. The wet cake was then made into a slurry by an emulsification device and dried by a spray-type drier, whereby "hydrated silica A" according to a wet method was obtained.

Production Example 2

Production of Hydrated Silica B

65 L of water and 1.25 L of an aqueous solution of sodium silicate (SiO$_2$: 160 g/L, the mol ratio SiO$_2$/Na$_2$O=3.3) were charged into a jacketed stainless reaction vessel (180 L) equipped with a stirrer and then heated to 96° C. Na$_2$O concentration in a resulting reaction solution was 0.015 mol/L. The same aqueous solution of sodium silicate as described above and sulfuric acid (18 mol/L) were simultaneously added dropwise to the reaction solution at flow rates of 750 mL/minute (the sodium silicate solution) and 33 mL/minute (sulfuric acid), respectively, with keeping the temperature of the reaction solution at 96° C. The neutralization reaction was carried out, while maintaining the Na$_2$O concentration in the reaction solution within the range of 0.005 mol/L to 0.035 mol/L by adjusting the flow rates of the sodium silicate solution and sulfuric acid. The reaction solution changed its color to opaque white in the midst of the neutralization reaction and then became a gel-like solution due to an increase in viscosity thereof 30 minutes after the start of the neutralization reaction. Addition of the sodium silicate solution and sulfuric acid to the reaction solution was continued and the reaction was stopped 100 minutes after the start of the neutralization reaction. Silica concentration in a resulting solution was 85 g/L. Then, the same sulfuric acid as described above was added to the resulting solution until pH of the solution dropped to 3, whereby a silicic acid slurry was obtained. The silicic acid slurry thus obtained was subjected to the same subsequent treatments as described in Production example 1, whereby "hydrated silica B" according to a wet method was obtained.

Production Example 3

Production of Hydrated Silica C

89 L of water and 1.70 L of an aqueous solution of sodium silicate (SiO$_2$: 160 g/L, the mol ratio SiO$_2$/Na$_2$O=3.3) were charged into a jacketed stainless reaction vessel (180 L) equipped with a stirrer and then heated to 82° C. Na$_2$O concentration in a resulting reaction solution was 0.015 mol/L. The same aqueous solution of sodium silicate as described above and sulfuric acid (18 mol/L) were simultaneously added dropwise to the reaction solution at flow rates of 520 mL/minute (the sodium silicate solution) and 23 mL/minute (sulfuric acid), respectively, with keeping the temperature of the reaction solution at 82° C. The neutralization reaction was carried out, while maintaining the Na$_2$O concentration in the reaction solution within the range of 0.005 mol/L to 0.035 mol/L by adjusting the flow rates of the sodium silicate solution and sulfuric acid. The reaction solution changed its color to opaque white in the midst of the neutralization reaction and then became a gel-like solution due to an increase in viscosity thereof 46 minutes after the start of the neutralization reaction. Addition of the sodium silicate solution and sulfuric acid to the reaction solution was continued and the reaction was stopped 100 minutes after the start of the neutralization reaction. Silica concentration in a resulting solution was 60 g/L. Then, the same sulfuric acid as described above was added to the resulting solution until pH of the solution dropped to 3, whereby a silicic acid slurry was obtained. The silicic acid slurry thus obtained was subjected to the same subsequent treatments as described in Production example 1, whereby "hydrated silica C" according to a wet method was obtained.

Production Example 4

Production of Hydrated Silica D

89 L of water and 1.70 L of an aqueous solution of sodium silicate (SiO$_2$: 160 g/L, the mol ratio SiO$_2$/Na$_2$O=3.3) were charged into a jacketed stainless reaction vessel (180 L) equipped with a stirrer and then heated to 75° C. Na$_2$O concentration in a resulting reaction solution was 0.015 mol/L. The same aqueous solution of sodium silicate as described above and sulfuric acid (18 mol/L) were simultaneously added dropwise to the reaction solution at flow rates of 520 mL/minute (the sodium silicate solution) and 23 mL/minute (sulfuric acid), respectively, with keeping the temperature of the reaction solution at 75° C. The neutralization reaction was carried out, while maintaining the Na$_2$O concentration in the reaction solution within the range of 0.005 mol/L to 0.035 mol/L by adjusting the flow rates of the sodium silicate solution and sulfuric acid. The reaction solution changed its color to opaque white in the midst of the neutralization reaction and then became a gel-like solution due to an increase in viscosity thereof 46 minutes after the start of the neutralization reaction. Addition of the sodium silicate solution and sulfuric acid to the reaction solution was continued and the reaction was stopped 100 minutes after the start of the neutralization reaction. Silica concentration in a resulting solution was 60 g/L. Then, the same sulfuric acid as described above was added to the resulting solution until pH of the solution dropped to 3, whereby a silicic acid slurry was obtained. The silicic acid slurry thus obtained was subjected to the same subsequent treatments as described in Production example 1, whereby "hydrated silica D" according to a wet method was obtained.

Production Example 5

Production of Hydrated Silica E

97 L of water and 1.8 L of an aqueous solution of sodium silicate (SiO$_2$: 160 g/L, the mol ratio SiO$_2$/Na$_2$O=3.3) were charged into a jacketed stainless reaction vessel (180 L)

equipped with a stirrer and then heated to 60° C. Na$_2$O concentration in a resulting reaction solution was 0.015 mol/L. The same aqueous solution of sodium silicate as described above and sulfuric acid (18 mol/L) were simultaneously added dropwise to the reaction solution at flow rates of 370 mL/minute (the sodium silicate solution) and 16 mL/minute (sulfuric acid), respectively, with keeping the temperature of the reaction solution at 60° C. The neutralization reaction was carried out, while maintaining the Na$_2$O concentration in the reaction solution within the range of 0.005 mol/L to 0.035 mol/L by adjusting the flow rates of the sodium silicate solution and sulfuric acid. The reaction solution changed its color to opaque white in the midst of the neutralization reaction and then became a gel-like solution due to an increase in viscosity thereof 68 minutes after the start of the neutralization reaction. Addition of the sodium silicate solution and sulfuric acid to the reaction solution was continued and the reaction was stopped 120 minutes after the start of the neutralization reaction. Silica concentration in a resulting solution was 51 g/L. Then, the same sulfuric acid as described above was added to the resulting solution until pH of the solution dropped to 3, whereby a silicic acid slurry was obtained. The silicic acid slurry thus obtained was subjected to the same subsequent treatments as described in Production example 1, whereby "hydrated silica E" according to a wet method was obtained.

Production Example 6

Production of Hydrated Silica F

100 L of water and 1.9 L of an aqueous solution of sodium silicate (SiO$_2$: 160 g/L, the mol ratio SiO$_2$/Na$_2$O=3.3) were charged into a jacketed stainless reaction vessel (180 L) equipped with a stirrer and then heated to 60° C. Na$_2$O concentration in a resulting reaction solution was 0.015 mol/L. The same aqueous solution of sodium silicate as described above and sulfuric acid (18 mol/L) were simultaneously added dropwise to the reaction solution at flow rates of 350 mL/minute (the sodium silicate solution) and 15 mL/minute (sulfuric acid), respectively, with keeping the temperature of the reaction solution at 60° C. The neutralization reaction was carried out, while maintaining the Na$_2$O concentration in the reaction solution within the range of 0.005 mol/L to 0.035 mol/L by adjusting the flow rates of the sodium silicate solution and sulfuric acid. The reaction solution changed its color to opaque white in the midst of the neutralization reaction and then became a gel-like solution due to an increase in viscosity thereof 75 minutes after the start of the neutralization reaction. Addition of the sodium silicate solution and sulfuric acid to the reaction solution was continued and the reaction was stopped 120 minutes after the start of the neutralization reaction. Silica concentration in a resulting solution was 48 g/L. Then, the same sulfuric acid as described above was added to the resulting solution until pH of the solution dropped to 3, whereby a silicic acid slurry was obtained. The silicic acid slurry thus obtained was subjected to the same subsequent treatments as described in Production example 1, whereby "hydrated silica F" according to a wet method was obtained.

Example 1

Samples 1 to 6

Sample rubber compositions 1 to 6 were prepared by blending and kneading the blend components thereof shown in Table 1 according to the conventional method, respectively. Then, sample green tires 1 to 6 were manufactured by applying the sample rubber compositions 1 to 6 thus prepared to tread rubbers thereof, respectively. The samples green tires 1 to 6 were subjected to a vulcanization process, whereby sample tires 1 to 6 were obtained. Types of the hydrated silica used in the respective sample tires 1 to 6 are shown in Table 4.

Example 2

Samples 7 to 12

Sample rubber compositions 7 to 12 were prepared by blending and kneading the blend components thereof shown in Table 2 according to the conventional method, respectively. Then, sample green tires 7 to 12 were manufactured by applying the sample rubber compositions 7 to 12 thus prepared to tread rubbers thereof, respectively. The samples green tires 7 to 12 were subjected to a vulcanization process, whereby sample tires 7 to 12 were obtained. Types of the hydrated silica used in the respective sample tires 7 to 12 are shown in Table 5.

Example 3

Samples 13 to 18

Sample rubber compositions 13 to 18 were prepared by blending and kneading the blend components thereof shown in Table 3 according to the conventional method, respectively. Then, sample green tires 13 to 18 were manufactured by applying the sample rubber compositions 13 to 18 thus prepared to tread rubbers thereof, respectively. The samples green tires 13 to 18 were subjected to a vulcanization process, whereby sample tires 13 to 18 were obtained. Types of the hydrated silica used in the respective sample tires 13 to 18 are shown in Table 6.

TABLE 1

| Blend components (parts by mass) | | |
|---|---|---|
| SBR | *1 | 100 |
| Carbon black | *2 | 15 |
| Silicic acid hydrate | *3 | 75 |
| Organic silicon | *4 | 7 |
| Aromatic oil | | 36 |
| Stearic acid | | 2 |
| Antioxidant 6C | *5 | 1 |
| Zinc white | | 3 |
| Vulcanization accelerator DPG | *6 | 1 |
| Vulcanization accelerator DM | *7 | 1 |
| Vulcanization accelerator NS | *8 | 1 |
| Sulfur | | 1.5 |

TABLE 2

| Blend components (parts by mass) | | |
|---|---|---|
| SBR | *1 | 100 |
| Silicic acid hydrate | *3 | 50 |
| Organic silicon | *4 | 5 |
| Aromatic oil | | 10 |
| Stearic acid | | 2 |
| Antioxidant 6C | *5 | 1 |
| Zinc white | | 3 |
| Vulcanization accelerator DPG | *6 | 1 |
| Vulcanization accelerator DM | *7 | 1 |
| Vulcanization accelerator NS | *8 | 1 |
| Sulfur | | 1.5 |

TABLE 3

| Blend components (parts by mass) | | |
|---|---|---|
| SBR | *1 | 100 |
| Silicic acid hydrate | *3 | 85 |
| Organic silicon | *9 | 5 |
| Aromatic oil | | 20 |
| Stearic acid | | 2 |
| Antioxidant 6C | *5 | 1 |
| Zinc white | | 3 |
| Vulcanization accelerator DPG | *6 | 1 |
| Vulcanization accelerator DM | *7 | 1 |
| Vulcanization accelerator NS | *8 | 1 |
| Sulfur | | 1.5 |

Figure 2:
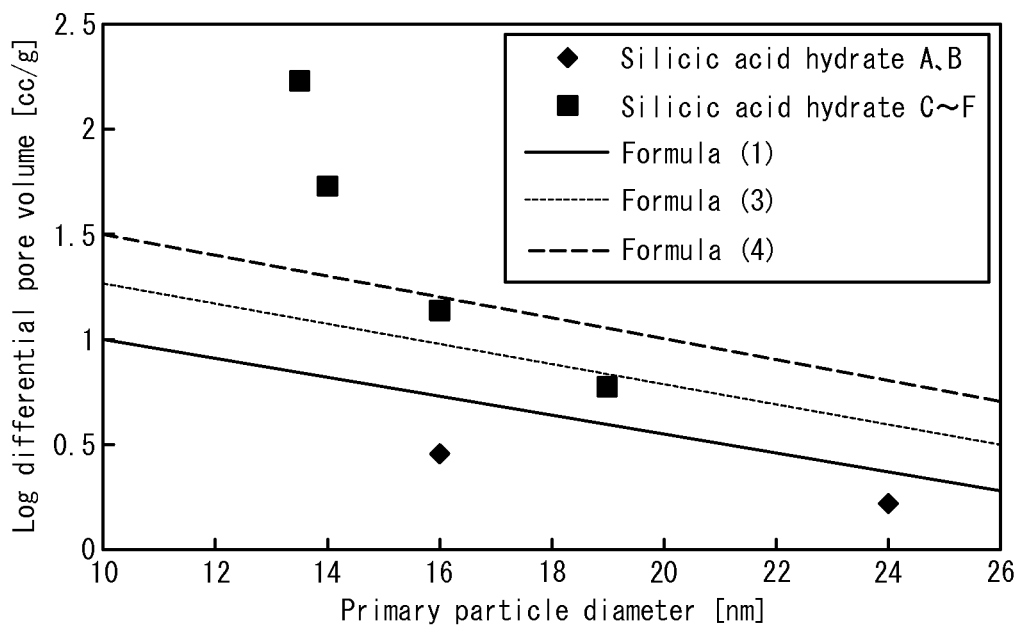
FIG. 2 is a graph showing a relationship between the primary particle diameter (D) of hydrated silica and the log differential pore volume (LP) in Example 1.
Figure 3:
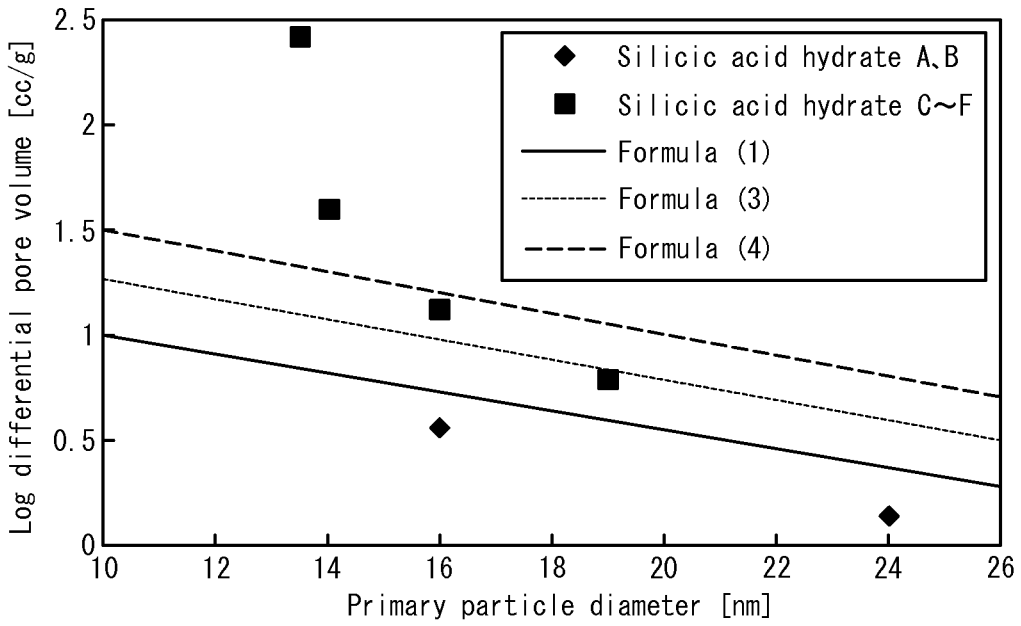
FIG. 3 is a graph showing a relationship between the primary particle diameter (D) of hydrated silica and the log differential pore volume (LP) in Example 2.
Figure 4:
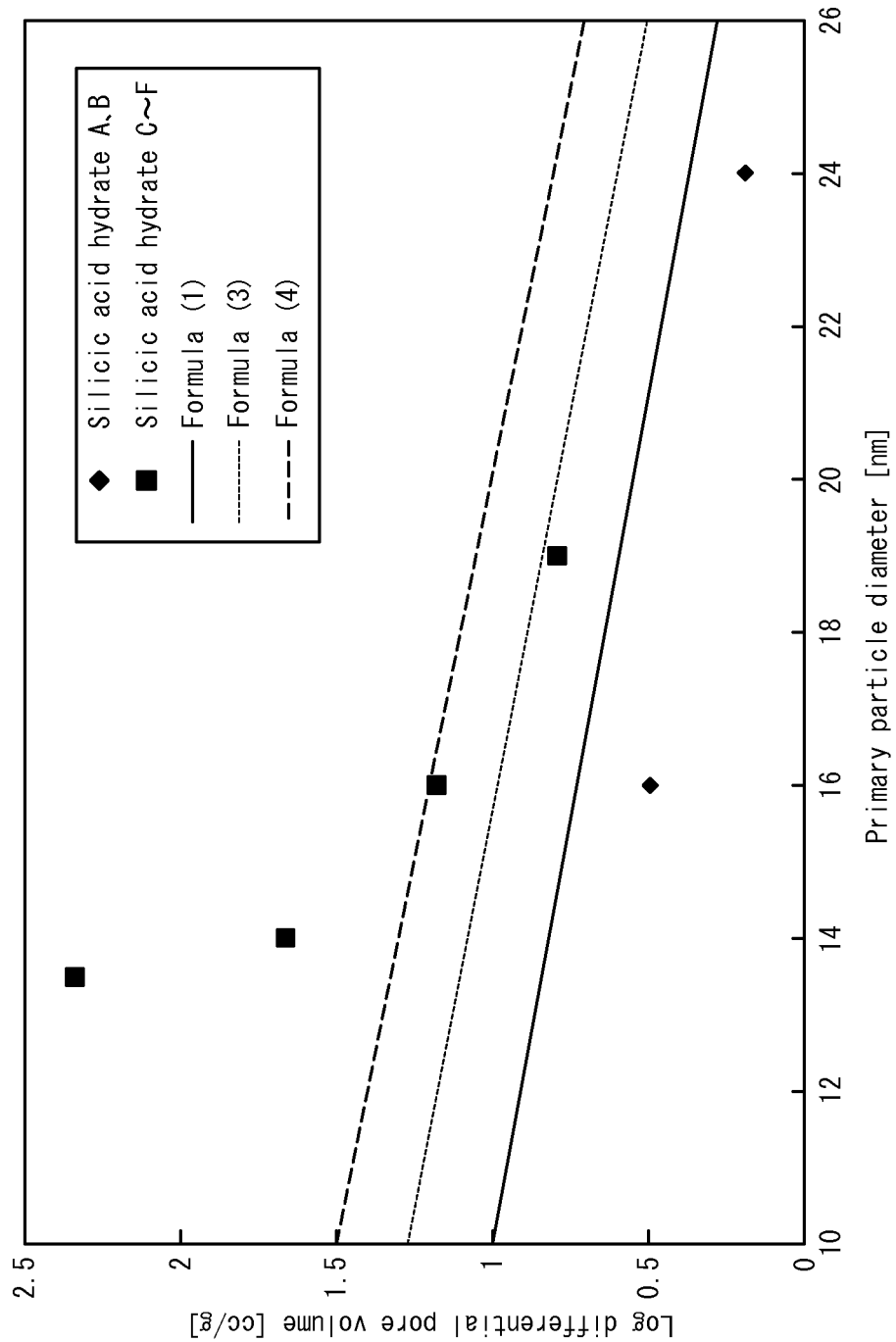
FIG. 4 is a graph showing a relationship between the primary particle diameter (D) of hydrated silica and the log differential pore volume (LP) in Example 3.

*1 "#1500", manufactured by JSR Corporation
*2 "SEAST®KH(N339)", manufactured by Tokai Carbon Co., Ltd.
*3 Hydrated silica A-F manufactured by Production examples 1 to 6 described above
*4 "NXT®", manufactured by Momentive Performance Materials Inc.
*5 N-(1,3-dimethylbutyl)-N'-phenyl-p-phenylenediamine or "Norac 6C", manufactured by Ouchi-Shinko Chemical Industrial Co., Ltd.
*6 Diphenylguanidine or "Noccelar D", manufactured by Ouchi-Shinko Chemical Industrial Co., Ltd.
*7 Benzothiazyl disulfide or "Noccelar DM-P", manufactured by Ouchi-Shinko Chemical Industrial Co., Ltd.
*8 N-t-butyl-2-benzothiazyl sulfonamide or "Noccelar NS-P", manufactured by Ouchi-Shinko Chemical Industrial Co., Ltd.
*9 Bis(3-triethoxysilylpropyl)tetrasulfide or "Si69", manufactured by Evonik Degussa GmbH (Measurement of the Log Differential Pore Volume and the Primary Particle Diameter of Hydrated Silica Contained in Each Sample Tire)
A piece of vulcanized rubber was cut out from each sample tire prepared as described above. The vulcanized rubber thus collected was put in a crucible and heated for 5 minutes at 750° C. with a lid on the crucible. The vulcanized rubber was then further heated for at least 3 hours at the same temperature without the lid on the crucible. After cooling the rubber, hydrochloric acid (6N) was added to the rubber and the rubber was left for 30 minutes. The rubber was then repeatedly washed, whereby the hydrated silica was extracted from the rubber composition.
The log differential pore volume data of the hydrated silica was obtained by: increasing pressure applied on pores of the hydrated silica particles by a mercury porosimeter "PORE-MASTER-33" manufactured by Quantachrome Instruments from 1 to 32000 PSI according to the mercury press-in method; and measuring amounts of mercury (having particle diameter in the range of $1.2 \times 10^5$ nm to $6 \times 10^5$ nm) pressed into the pores, thereby determining the log differential pore volumes of pores having respective diameters, of the hydrated silica.
The average primary particle diameter data of the hydrated silica was obtained by: adding 10 mg of the hydrated silica to 4 mL of ethanol and leaving the mixture solution in a ultrasonic cleaning device for 10 minutes; applying 2 mL of the solution thus treated by the ultrasonic cleaning device to a copper TEM grid provided with a support film, drying the solvent, and then carrying out TEM observation by using "JEM2200-FS", manufactured by JEOL Ltd. at acceleration voltage of 200 kV and ×50,000 magnification, to obtain TEM observation images of the hydrated silica particles; measuring the major axis of each primary particle of the hydrated silica, based on the TEM observation images thus obtained, by using a measuring function of the application software; and calculating the average of the major axes of 100 primary particles of the hydrated silica.
The data of the log differential pore volume and the primary particle diameter of the hydrated silica of each sample tire, thus obtained, are shown in Tables 4 to 6. In this connection, FIG. 2 shows a graph plotting a relationship between the primary particle diameter and the log differential pore volume for the hydrated silicas A-F analyzed in Example 1. FIG. 3 shows a graph plotting a relationship between the primary particle diameter and the log differential pore volume for the hydrated silicas A-F analyzed in Example 2. FIG. 4 shows a graph plotting a relationship between the primary particle diameter and the log differential pore volume for the hydrated silicas A-F analyzed in Example 3.

(Evaluation)
Each pneumatic sample tire (size: 195/65R15) was manufactured by using each rubber composition sample according to the conventional method, as described above. Each sample tire was then subjected to following performance tests.

(1) Wear Resistance
Wear resistance of each sample tire was evaluated by: driving a vehicle 20,000 km in a state where the tire was mounted thereon; and then measuring a remaining groove depth in the sample tire. Regarding the evaluation of wear resistance, Table 4 shows respective index values of the remaining groove depth as wear resistance relative to the remaining groove depth of sample tire 1 being "100"; Table 5 shows respective index values of the remaining groove depth as wear resistance relative to the remaining groove depth of sample tire 7 being "100"; and Table 6 shows respective index values of the remaining groove depth as wear resistance relative to the remaining groove depth of sample tire 13 being "100". The larger index value represents the higher or better wear resistance.

(2) Rolling Resistance
Rolling resistance at 80 km/hour was evaluated for each sample tire by using an indoor single-axis drum tester for measuring rolling resistance. Regarding the evaluation of rolling resistance, Table 4 shows respective index values of rolling resistance properties relative to the rolling resistance properties of sample tire 1 being "100"; Table 5 shows respective index values of rolling resistance properties relative to the rolling resistance properties of sample tire 7 being "100"; and Table 6 shows respective index values of rolling resistance properties relative to the rolling resistance properties of sample tire 13 being "100". The larger index value represents the smaller rolling resistance, i.e. the better result.

TABLE 4

| Sample No. | 1 | 2 | 3 | 4 | 5 | 6 |
|---|---|---|---|---|---|---|
| Type of silicic acid hydrate | A | B | C | D | E | F |
| Log differential pore volume [cc/g] | 0.46 | 0.21 | 0.76 | 1.13 | 1.73 | 2.23 |
| Primary particle diameter [nm] | 16 | 24 | 19 | 16 | 14 | 13.5 |

TABLE 4-continued

| Sample No. | 1 | 2 | 3 | 4 | 5 | 6 |
|---|---|---|---|---|---|---|
| Wear resistance | 100 | 95 | 105 | 110 | 114 | 119 |
| Rolling resistance | 100 | 95 | 98 | 100 | 100 | 99 |
| Note | Comp. Example | Comp. Example | Present Example | Present Example | Present Example | Present Example |

"Comp. Example" represents Comparative Example and "Present Example" represents Example according to the present invention

TABLE 5

| Sample No. | 7 | 8 | 9 | 10 | 11 | 12 |
|---|---|---|---|---|---|---|
| Type of silicic acid hydrate | A | B | C | D | E | F |
| Log differential pore volume [cc/g] | 0.55 | 0.13 | 0.8 | 1.12 | 1.6 | 2.42 |
| Primary particle diameter [nm] | 16 | 24 | 19 | 16 | 14 | 13.5 |
| Wear resistance | 100 | 97 | 103 | 108 | 112 | 118 |
| Rolling resistance | 100 | 95 | 98 | 100 | 100 | 99 |
| Note | Comp. Example | Comp. Example | Present Example | Present Example | Present Example | Present Example |

*"Comp. Example" represents Comparative Example and "Present Example" represents Example according to the present invention.

TABLE 6

| Sample No. | 13 | 14 | 15 | 16 | 17 | 18 |
|---|---|---|---|---|---|---|
| Type of silicic acid hydrate | A | B | C | D | E | F |
| Log differential pore volume [cc/g] | 0.49 | 0.19 | 0.82 | 1.18 | 1.66 | 2.34 |
| Primary particle diameter [nm] | 16 | 24 | 19 | 16 | 14 | 13.5 |
| Wear resistance | 100 | 96 | 103 | 109 | 115 | 120 |
| Rolling resistance | 100 | 102 | 101 | 100 | 100 | 99 |
| Note | Comp. Example | Comp. Example | Present Example | Present Example | Present Example | Present Example |

*"Comp. Example" represents Comparative Example and "Present Example" represents Example according to the present invention.

It is understood from the results shown in Tables 4 to 6 and FIGS. 2 to 4 that sample tires 3 to 6, 9 to 12, and 15 to 18, i.e. the sample tires of Examples according to the present invention, exhibit higher index values (wear resistance in particular) than sample tires 1, 2, 7, 8, 13 and 14, i.e. the sample tires of Comparative Examples. It is assumed from this finding that setting the primary particle diameter (D) and the log differential pore volume (LP) at a pore diameter of 30 nm, of the hydrated silica in the rubber composition, to satisfy the formula (1) and (2) contributes to improving wear resistance of a tire. Further, it is understood from the results shown in Tables 4 to 6 and FIGS. 2 to 4 that sample tires 4, 10 and 16 exhibit better wear resistance than sample tires 3, 9 and 15 and that sample tires 5, 6, 11, 12, 17 and 18 exhibit further better wear resistance than sample tires 3, 9 and 15 (even better than sample tires 4, 10 and 16). It is assumed from this finding that setting the primary particle diameter (D) and the log differential pore volume (LP) at a pore diameter of 30 nm, of the hydrated silica in the rubber composition, to satisfy the formula (3) or (4) results in a further better effect of improving wear resistance of a tire.

Industrial Applicability

According to the rubber composition of the present invention, it is possible to provide: a rubber composition capable of achieving good wear resistance without causing deterioration of rolling resistance of a tire; and a cross-linked rubber composition obtained by cross-linking the rubber composition. It is therefore possible to realize a high-performance pneumatic tire exhibiting good rolling resistance properties and good wear resistance in a compatible manner by using the rubber composition or the cross-linked rubber composition as a tire material.

The invention claimed is:

1. A rubber composition obtained by blending and kneading a rubber component and hydrated silica together, characterized in that:
provided that D represents the average primary particle diameter and LP represents the log differential pore volume at a pore diameter of 30 nm, of the hydrated silica in the rubber composition, D and LP satisfy relationships represented by following formulae (1) and (2):

$$LP > -0.045 \times D + 1.45 \quad (1)$$

$$10 \leq D < 30 \text{ nm} \quad (2).$$

2. The rubber composition of claim 1, wherein the hydrated silica is blended at a content of 10 to 150 parts by mass with respect to 100 parts by mass of the rubber component.

3. The rubber composition of claim 1, wherein the rubber component is at least one rubber selected from natural rubber and diene-based synthetic rubber.

4. A cross-linked rubber composition, as a cross-linked rubber product obtained by cross-linking the rubber composition of claim 1.

5. A tire, including the rubber composition of claim 1 as a material thereof.

6. A tire, including the cross-linked rubber composition of claim 4 as a material thereof.

* * * * *